United States Patent
Mauderer et al.

(10) Patent No.: US 8,957,772 B2
(45) Date of Patent: Feb. 17, 2015

(54) SYSTEM FOR VEHICLE BRAKING DETECTION

(75) Inventors: Hans-Peter Mauderer, Gaggenau (DE); Klaus Hübner, Pforzheim (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 620 days.

(21) Appl. No.: 13/213,918

(22) Filed: Aug. 19, 2011

(65) Prior Publication Data

US 2012/0044066 A1 Feb. 23, 2012

(30) Foreign Application Priority Data

Aug. 23, 2010 (EP) .................................... 10008769

(51) Int. Cl.
- B60Q 1/44 (2006.01)
- B60T 7/22 (2006.01)
- B60T 17/22 (2006.01)
- G08G 1/16 (2006.01)

(52) U.S. Cl.
CPC . B60T 7/22 (2013.01); B60T 17/22 (2013.01); G08G 1/161 (2013.01)
USPC ............ 340/479; 340/467; 340/441; 340/435

(58) Field of Classification Search
CPC ...... B60Q 1/444; B60Q 1/2607; B60Q 9/008; B60Q 2300/43
USPC ................. 340/435, 436, 441, 463, 479, 467; 180/167, 169, 178, 271; 701/1, 34, 36
See application file for complete search history.

(56) References Cited

U.S. PATENT DOCUMENTS

| | | | | |
|---|---|---|---|---|
| 5,610,578 A | * | 3/1997 | Gilmore | 340/479 |
| 5,760,708 A | | 6/1998 | Seith | 340/903 |
| 6,100,799 A | | 8/2000 | Fenk | 340/467 |
| 6,333,688 B1 | * | 12/2001 | Brown et al. | 340/479 |

(Continued)

FOREIGN PATENT DOCUMENTS

| | | | | |
|---|---|---|---|---|
| DE | 3516118 A1 | 6/1986 | | B60Q 1/44 |
| DE | 19624046 A1 | 12/1997 | | B60Q 1/44 |

(Continued)

OTHER PUBLICATIONS

European Search Report dated May 30, 2011, in European Patent Application No. EP 10008769.1, 8 pgs.

*Primary Examiner* — Firmin Backer
*Assistant Examiner* — Nay Tun
(74) *Attorney, Agent, or Firm* — Alleman Hall McCoy Russell & Tuttle LLP

(57) ABSTRACT

A system for detection of braking of a vehicle may include a device provided in a first vehicle. The device may be in communication with a detector mounted to the first vehicle to monitor an area in front of the first vehicle. The detector may detect light emitted by the rear lights of a second vehicle when the second vehicle is ahead of the first vehicle in the monitored area. The device may acquire data from the detector and analyze the acquired data in order to detect an optical signal emitted by the rear lights of the second vehicle. The optical signal may encode information indicative of a braking procedure being performed by the second vehicle. The device may evaluate the detected optical signal in order to derive the information indicative of the braking procedure of the second vehicle.

19 Claims, 5 Drawing Sheets

(56) References Cited

U.S. PATENT DOCUMENTS

| | | | |
|---|---|---|---|
| 6,335,682 B1* | 1/2002 | Bates et al. | 340/479 |
| 7,077,549 B1* | 7/2006 | Corliss | 362/499 |
| 7,332,877 B2* | 2/2008 | Crodian et al. | 315/297 |
| 7,573,378 B2* | 8/2009 | Matsumoto et al. | 340/479 |
| 7,755,474 B2* | 7/2010 | Singh | 340/479 |
| 7,948,366 B2* | 5/2011 | Li | 340/467 |
| 7,961,086 B2* | 6/2011 | Bradley | 340/468 |
| 2003/0211842 A1 | 11/2003 | Kempf et al. | 455/411 |
| 2005/0253700 A1 | 11/2005 | Keena | 340/464 |
| 2008/0164993 A1* | 7/2008 | Douglas | 340/479 |
| 2008/0218327 A1* | 9/2008 | Li | 340/467 |
| 2009/0134987 A1 | 5/2009 | Oltmann et al. | 340/435 |
| 2009/0212935 A1 | 8/2009 | Luo | 340/467 |

FOREIGN PATENT DOCUMENTS

| | | | |
|---|---|---|---|
| DE | 10328755 A1 | 7/2004 | G08G 1/16 |
| DE | 202005003101 U1 | 5/2005 | B60Q 1/44 |
| DE | 102005059688 A1 | 6/2007 | B60Q 1/52 |
| DE | 102006046165 A1 | 4/2008 | B60Q 1/44 |
| EP | 1458163 A1 | 9/2004 | H04L 29/06 |
| EP | 1633107 A1 | 3/2006 | H04L 29/06 |
| GB | 2425386 A | 10/2006 | G08G 1/16 |
| WO | WO 2004/005962 | 1/2004 | G01S 13/93 |
| WO | WO 2008/146304 A2 | 12/2008 | G08G 1/16 |

* cited by examiner

SYSTEM FOR VEHICLE BRAKING DETECTION

PRIORITY CLAIM

This application claims the benefit of priority from European Patent Application No. EP 10 008 769.1, filed Aug. 23, 2010, which is incorporated by reference.

BACKGROUND OF THE INVENTION

1. Technical Field

The invention relates to a system for detecting braking of a vehicle based on light emitted from rear lights of the vehicle. The invention further relates to a vehicle lighting control unit which controls the emission of light from rear lights of a vehicle.

2. Related Art

Conventional vehicles are equipped with brake lights which are illuminated in response to the driver actuating the brake pedal of the vehicle, resulting in a deceleration of the vehicle. The driver of a following vehicle is thus warned and enabled to react by reducing speed. Modern vehicles often have an improved braking performance which can for example be achieved by making use of electronic systems such as the anti-lock braking system (ABS) or an electronic stability control system (ESC). Accordingly, relatively fast deceleration can be achieved by such vehicles. This can be problematic for a driver in a following vehicle who only observes the illumination of the brake lights but has no indication about how strong the preceding vehicle is braking.

Vehicle manufacturers are trying to overcome this problem by providing particular visible, indications to the driver of a following vehicle by means of the rear lights. Examples of such indications are the flashing of the brake lights or the hazard flashers. Other implementations include increasing the brightness of the brake lights or increasing the light emitting area of the brake lights, e.g. by emitting light from an additional segment of the brake light or another light (which also increases the brightness perceived by the following driver). Yet such systems have not been able to show a significant improvement in the prevention of rear end collisions. This may be due to the fact that a driver of a following vehicle has to recognize the braking and has to react accordingly.

It is desirable to improve the warning of a following driver so that rear end collisions can be avoided. In particular, improvement of the reaction time after which a following vehicle starts to decelerate is desired. Also, a following vehicle would benefit from having more information available on a braking procedure being performed by the preceding vehicle.

Accordingly, there is a need to improve the detection of the braking of a vehicle.

SUMMARY

A system for vehicle braking detection includes a method of detecting braking of a vehicle. The method is automatically performed by a device provided in a first vehicle, the device may be in communication with a detector mounted to the first vehicle and monitoring an area in front of the first vehicle. The method includes the steps of acquiring data from the detector which detects light emitted by the rear lights of a second vehicle if the second vehicle is travelling ahead of the first vehicle in the monitored area, and analyzing the acquired data in order to detect an optical signal which is emitted by the rear lights of the second vehicle and which encodes information indicative of a braking procedure performed by the second vehicle, such as at least an indication of braking strength. Further, the detected optical signal may be evaluated in order to derive information regarding the braking procedure of the second vehicle encoded therein.

With this method it is possible to automatically obtain an indication of the braking strength (or braking deceleration) of the second vehicle travelling ahead. Since the information is automatically obtained, reaction time may be reduced. As an example, the driver of the first vehicle may be warned if the second (preceding) vehicle is braking hard (decelerating quickly), or braking lightly (decelerating more slowly). In addition, for example, an automated driver assistance system may be automatically engaged on the basis of the derived information. Since reaction times can be reduced, the braking of the first vehicle can be initialized earlier and rear end collisions with the second (preceding) vehicle may be avoided.

In an example system, the analysis of the acquired data may be performed by the system so as to detect a human perceivable optical signal encoding the breaking strength. Accordingly, a preceding vehicle providing the optical signal may not need to be equipped with a particular encoder or signal generator. Instead, optical signals provided by such preceding vehicles for drawing attention to e.g. a severe braking or an emergency braking procedure can be automatically detected and evaluated by the present system.

As an example, the acquired data may be analyzed so as to detect as the optical signal at least one of a brightness of the emitted light and an intensity modulation of the emitted light at a human perceivable frequency. In this example, different brightness levels, which may be achieved by increasing the intensity of emitted light or the area of light emission, may indicate different braking strengths/decelerations of a preceding vehicle. In addition, or alternatively, an intensity modulation of a particular type of rear light or at a particular frequency may indicate a level of braking strength, such as an emergency braking (e.g. the driver slamming on the brake). By analyzing the acquired data for at least one of brightness and intensity modulation, an optical signal indicating braking strength may thus be readily recognized. Such an analysis may alternatively, or in addition, detect brightness differences that are not human-perceivable.

When evaluating a detected optical signal, at least one of the following information on the braking procedure performed by the second (or preceding) vehicle may be derived: An emergency braking performed by the second vehicle, a rate of deceleration of the second vehicle, an activation of an anti-lock braking system, or the locking of a wheel of the second vehicle. Obtaining such information has the advantage that a warning tailored to the actual traffic situation can be provided to the driver or an automated driver assistance system can be enabled or provided in accordance with the current traffic situation.

The analysis of the acquired data may be performed by the device such that any of one or more different optical signal patterns may be recognized and reacted to by the system. For example, any one or more of the following optical signals emitted by the rear lights of the second (preceding) vehicle may be detectable: an intensity modulation of the brake light at a human perceivable frequency, preferably in the range between about 0.5 and about 10 Hz, even more preferably between about 1 and 5 Hz, e.g. at 4 Hz; an activation of a hazard flasher; an increase of a light emitting area of the brake lights; an increase of an intensity of light emitted by the brake lights or other lights (e.g. taillights); and/or the presence of an intensity difference between different light emitting areas of the rear lights.

Most of these optical signals can be human-perceivable. Yet some signals, such as a relative intensity between different light emitting areas or an intensity change of emitted light may not be human-perceivable. Further information can thus be derived by automatically analyzing the optical signal which is not visible to the human eye.

As an example, the analysis of the acquired data by the detector may include a determination of a brightness of at least a part of the second vehicle's rear lights from the acquired data and comparison of the determined brightness with a threshold value, preferably under consideration of the current driving situation. An optical signal encoding (or indicating) a braking strength indication may then be detected or determined by the system if the determined brightness is higher than the threshold value. As part of the analysis to determine the braking strength, the system may also consider current driving conditions which have an influence on the brightness perceived by the detector, such as distance between the vehicles, the type of the preceding vehicle, current weather conditions, and the like. The threshold value may be determined from a brightness reference under consideration of such conditions. A brightness reference may also be determined by the system based on changes in previously detected brightness conditions such as, a previously detected brightness of a part or all of the second vehicle's rear lights. As an example, the brightness of a brake light may be detected several times, with a lower detected brightness forming a reference value for detecting a relatively higher brightness. In addition or alternatively, a change in intensity modulation may be used by the system to determine a brightness reference based on previously detected conditions. In other words, the system may perform an analysis of the detected brightness of the second vehicle in order to learn when the second vehicle is braking hard (decelerating quickly), or braking lightly (decelerating more slowly). Thus, the system may also determine when a preceding vehicle does not include variations in detected brightness and react accordingly, such as by providing a corresponding indication to an operator.

An increasing brightness of a preceding vehicle's rear lights, e.g. brake lights, can thus be identified by the system, despite variations in light intensity, location and operating conditions.

The analysis of the acquired data may also include determination by the system from the acquired data of a brightness in at least a first light emitting area and a second light emitting area of the rear lights of the second vehicle. A relative brightness between the at least two areas and/or the locations of the areas having the relative brightness may then be determined by the system. The relative brightness and/or the determined locations may then constitute the optical signal. As an example, the presence of a relative brightness between two areas may indicate particular information, or the brightness difference may be the encoded information, or the positioning of the brighter area and the darker area may be the encoded information.

The evaluation of the detected optical signal by the system may include determination of the braking procedure of the preceding vehicle from the relative brightness and/or brightness pattern. The braking procedure may include indication of at least one of a rate of deceleration, the activation of an anti-lock braking system or the locking of a wheel of the second vehicle. Such information may be determined and encoded by the detector as brightness information, such as different relative brightness information, or different locations of the brighter and darker light emitting areas.

As an example, the first and second areas of the second (preceding) vehicle's rear lights may be at least one of an upper part and a lower part of the brake light; a left part and a right part of the brake light; a left brake light and a right brake light; or a first part and a second part of an illumination pattern provided on a brake light. While a brightness difference between the left and right brake light may for example indicate the rate of deceleration, the location of the darker brake light (left or right) may indicate whether the anti-lock braking system (ABS) is engaged or not. In some examples, the brightness differences may be visible to the human eye, while in others the brightness differences may not be. The visibility of the brake lights may thus not be disturbed, while by means of the system the encoded information can still be resolved.

Analysis of the acquired data may be performed so that an emergency stop signal emitted by the rear lights of the second vehicle is detectable as the braking procedure encoded in the optical signal. The emergency stop signal may, for example, be a predetermined signal from a uniform set of vehicle manufacturing regulations, such as the regulations provided in ECE regulation 48 regading installation of lighting and lighting signalling devices.

The system may further include generation of a signal for a driver assistance system or a driver warning system included in the first vehicle on the basis of the derived information. Such a generated signal can then be supplied to the corresponding system. Accordingly, a driver assistance system can be enabled on the basis of the signal, e.g. by preparing the brake system of the vehicle or by activating the brake system of the vehicle. It may thus be ensured that a safe distance to the preceding vehicle is kept. Additionally or alternatively, a warning can be given out to the driver on the basis of the generated signal and thus on the derived information. As an example, an acoustic, tactile and/or visual warning signal may be given out if an emergency braking of the preceding vehicle is detected.

The system for vehicle brake detection may be a separate system having a device and detector that provides external signals to other systems in a vehicle, or external to a vehicle. Alternatively, the vehicle brake detection system may be incorporated as part of another system. For example, the device included in the system for vehicle braking may be part of a driver assistance system, with the generated signal being supplied to the part of the system which is responsible for taking the corresponding action. The detector included in the vehicle braking system may be a camera or a 3D camera, such as a photonic mixer device (PMD), which may, or may not be, part of the driver assistance system. In other examples a simple photo detector may be used for the detector, which can be provided with filters for filtering out the light emitted by the rear lights of the preceding vehicle.

In another example the system for braking detection may be a device for detecting braking of a vehicle. The device is adapted to be mounted in a first vehicle. The device includes an interface in communication with a detector mounted to the first vehicle for monitoring an area in front of the first vehicle. The device is adapted to acquire data from the detector over the interface, the detector may detect light emitted by the rear lights of a second vehicle if the second vehicle is travelling ahead of the first vehicle in the monitored area. The device also includes an analyzing unit adapted to analyze the acquired data in order to detect an optical signal, which is emitted by the rear lights of the second vehicle. The analyzing unit may also encode information indicating a braking procedure performed by the second vehicle, the information may include at least an indication of braking strength. The device is further provided with an evaluation unit which is adapted to evaluate the detected optical signal in order to derive the information on the braking procedure of the second vehicle encoded therein.

The device may also include an interface to a driver assistance system or a driver warning system, or any other system included within, or external to the vehicle. The device may then be adapted to supply a signal corresponding to the derived information to the driver assistance system, the driver warning system, or any other system. The device may be stand alone and independently operated, or may be part of a driver assistance system.

The system for vehicle braking detection may also include a vehicle lighting control unit adapted to control the emission of light from the rear lights of a vehicle. The control unit may include an interface adapted to receive data on vehicle deceleration and/or a status of the vehicle's braking system, an encoding unit adapted to encode the information received on the interface into a light control signal, and a controller adapted to independently adjust the intensity of light emitted from at least a first area and a second area of the rear lights in accordance with the light control signal. The encoding unit may be configured such that information is encoded into a difference of intensity of light emitted by the at least two areas. The information may be encoded into the relative emitted light intensity or into the positioning of the at least two areas having the relative intensity.

With such a lighting control unit, information on the braking procedure performed by the vehicle into which the unit is installed can be relayed to a following vehicle. The vehicle lighting control unit may thus interact with the system described previously if such a system is installed in the following vehicle. The device may automatically detect and decode the information transmitted by the vehicle lighting control unit. If the vehicle performs severe braking, the reaction time of following vehicles can be reduced, and rear end collisions may thus be prevented.

Besides the relative intensity, the position of the at least two areas may also encode information. With the same relative intensity, further information on the status of the vehicles braking system, such as whether the ABS is activated or a wheel is locking, can be encoded and transmitted. Other information that may be encoded comprises the performing of a severe braking or an emergency stop (e.g. the driver slamming on the brakes).

In an example implementation the first and second areas of the vehicle's rear lights include at least one of an upper part and a lower part of the brake lights, a left part and a right part of the brake lights, a left brake light and a right brake light, or a pattern of areas provided on at least one brake light.

The system may also include a computer program product that can be loaded into a memory of a computing device. The operation of the system may be implemented using instructions and/or software code portions included in the memory for performing any part of the functionality discussed.

The system for vehicle brake detection may improve warning of a driver so that rear end collisions can be avoided. In particular, the reaction time after which a following vehicle starts to decelerate may be improved. Also, the following vehicle can benefit from having more information available on the braking procedure being performed by the preceding vehicle.

It should be understood that the features mentioned above and those yet to be explained below can be used not only in the respective combinations indicated, but also in other combinations or in isolation.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
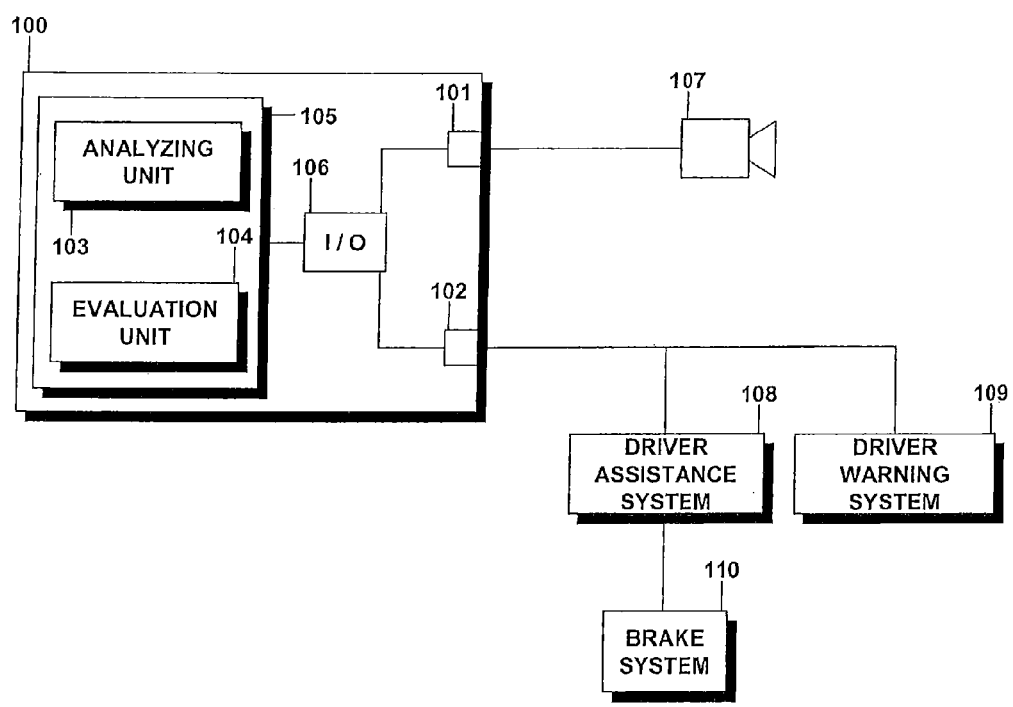
FIG. 1 is a schematic diagram illustrating the components of an example system for vehicle braking detection.

FIG. 1 schematically illustrates the components of an example system for vehicle braking detection that includes a device 100 for detecting braking of a vehicle. The device 100 is mounted to a vehicle which may be equipped with a driver assistance system 108. Device 100 may be part of the driver assistance system 108, yet it may also be independent of the driver assistance system 108. In other examples, the driver assistance system 108 may be omitted. Device 100 includes an interface 101 in communication with a detector 107.

Detector 107 is mounted to the vehicle such that it detects light coming from a region in front of the vehicle. Detector 107 can thus detect light which is emitted by a light source, such as the rear lights of a vehicle travelling in front of the vehicle upon which device 100 is mounted. Detector 100 can for example detect light emitted by light sources such as brake lights, hazard flashers, tail lights and the like. Several implementations of detector 107 are conceivable that are capable of performing this function.

Detector 107 can be a simple photo detector. It may then be provided with optical filters which transmit light of a particular color corresponding to a light source e.g. brake lights or hazard flashers. Detector 107 may also be a camera, such as a charge coupled device (CCD) or a complimentary metal oxide semiconductor (CMOS) camera, or a 3D camera, such as a photonic mixer device. In some examples, detector 107 may be the optical detector or camera of the driver assistance system 108.

Device 100 further includes a processing unit 105, which can be implemented as one or more microprocessors, digital signal processors, application-specific integrated circuits or the like. Device 100 may also include one or more types of memory, such as memory included in processing unit 105. The memory may be a non-transitory recording medium, computer readable medium and/or memory. Instructions in the form of computer software, firmware, data or any other form of computer code and/or computer program readable by a processor within the system may be stored in the non-transitory recording medium. Here, examples of the recording medium, computer readable medium, and/or memory include a recording medium such as semiconductor memory, such as a random access memory (RAM), read only memory (ROM), flash memory, or any other form of data storage device or system. In addition or alternatively, memory may include a flexible disk, a CD-ROM, a DVD, a memory storage device, or any form or data storage device that is external to or removable from the system.

The processing unit 105 controls the operation of device 100, e.g. in accordance with control instructions stored in the memory. The functional units 103 and 104 illustrated in FIG. 1 may also be implemented at least in part as software code portions, or instructions that are being executed by processing unit 105. The term "unit" may be defined to include one or more executable parts of the system. As described herein, the units are defined to include software, hardware or some combination thereof executable by the processor. Software included in the units may include instructions stored in memory or a computer readable medium that are executable by the processor, or any other processor. Hardware included in the units may include various devices, components, circuits, gates, circuit boards, and the like that are executable, directed, and/or controlled for performance by the processor.

Processing unit 105 is adapted to acquire over input/output unit 106 and interface 101 data from the detector 107. The acquired data can be image data comprising a series of image frames, or it may be a simple photo detector signal indicating a detected light intensity. The acquired data can at least temporarily be stored in the memory, such as memory of the processing unit 105.

Analyzing unit 103 processes the acquired data in order to detect an optical signal which is emitted by the rear light of a vehicle located in the region monitored by detector 107. In particular, the acquired data is analyzed to find an optical signal which encodes information on the braking procedure being performed by a vehicle, such as a vehicle travelling ahead. The optical signal may also include an indication about the braking deceleration or braking strength of the vehicle. A number of possibilities exists for encoding such information into the light emitted by the rear lights of the preceding vehicle, and accordingly analyzing unit 103 analyzes the acquired data for any of a number of different optical signals.

An indication of braking strength that may be encoded in an optical signal emitted by the rear light may be that the vehicle is braking severely or performing emergency braking. Optical signals for encoding such information may include different optical lighting patterns, such as: flashing the brake lights at a particular, frequency; activating the hazard flashers; increasing the intensity of the light emitted by the brake lights; increasing the area of the brake lights; illuminating two or more different areas of the rear lights at different intensities. Other examples of optical signals are certainly conceivable, and it is not intended that the optical signals be limited to the described examples. Increasing the area of the brake light effectively increases the brightness, which may for example be achieved by additionally illuminating the tail lights at a higher than normal intensity (e.g. corresponding to the intensity of the brake lights), providing a segmented brake light and lighting an additional segment, or the like. Analyzing unit 103 can be adapted to detect one or any combination of optical signals.

Depending on the detector used, the presence and meaning of an optical signal can be detected in different ways. If, for example, an intensity modulation of brake lights or activation of hazard flashers are used as an optical signal, the data acquired from a photo detector or a camera can be analyzed by looking for the corresponding frequency in the acquired data. For example, an increase in the area of brake lights can be detected by means of image analysis. In another example, an increase in intensity of light emitted by the brake lights may be detected by monitoring the intensity over a number of frames, so that a reference can be established. Alternatively, or in addition, a reference on the size of the brake lights or their general intensity may be obtained from a database which stores such information for different types of vehicles. The vehicle type may be, for example, automatically identified by image analysis. When comparing the acquired data with a reference, attention may further be paid to the distance to the vehicle travelling ahead, which may be derived by means of detector 107 when implemented as a PMD, or by other means.

In still another example, information may be encoded by means of an intensity difference between different light emitting areas of the rear lights. In such a case image analyses can identify the position of the rear lights and the corresponding areas and without any reference determine the intensity difference. Detection of the optical signal in the acquired data is thus facilitated.

Device 100 further includes evaluation unit 104 which derives the information provided in a detected optical signal, i.e. it decodes the optical signal. This decoding may be rather simple in the cases where the presence of the optical signal directly corresponds to a particular information. As an example, if any of the optical signals mentioned above is presented in the acquired data, evaluation unit 104 may determine that the preceding vehicle is performing an emergency braking. In other configurations, evaluation unit 104 may derive more detailed information. This is also illustrated further below with respect to FIGS. 2-4. As an example, evaluation unit 104 may derive from the frequency of a detected intensity modulation a rate of deceleration of the preceding vehicle. Similarly, evaluation unit 104 may determine from the increase of intensity or from the difference between different light emitting areas a deceleration rate of the preceding vehicle. In a further example, evaluation unit 104 may derive from a relative difference in brightness between two areas of the rear lights of the preceding vehicle the information if the ABS of the preceding vehicle is activated or if a wheel of the preceding vehicle is locked. Accordingly, by making use of analyzing unit 103 and evaluation unit 104, device 100 has detailed information available on the braking procedure performed by a preceding vehicle.

Optical signals for indicating an emergency braking condition can be provided such that they are human-perceivable, so that drivers of conventional vehicles can recognize the signal and can be alerted. Device 100 is adapted to detect and evaluate such signals. Other optical signals such as the previously mentioned difference in brightness (or relative brightness) may not be human-perceivable, and device 100 may also be adapted to detect these signals and determine a corresponding braking procedure encoded therein. Other examples of device 100 may be configured to detect only one type of optical signal pattern, such as increases in intensity modulation, increases in brightness, lighting patterns or some other optically based encoding, while other examples of device 100 may be configured to detect some combination of two or more, or a combination of particular optical signals.

Device 100 may further include an interface 102 to driver assistance system 108 and driver warning system 109. In accordance with the information derived by evaluation unit 104, device 100 may generate a signal, such as a control signal, which is supplied to one or both systems, or any other system internal to the vehicle, or external to the vehicle. For example, a signal supplied to driver warning system 109 may prompt the system to provide an acoustic, tactile, or visual warning to the driver, indicating a braking procedure such as that the preceding vehicle is performing an emergency braking.

Device 100 may provide to driver assistance system 108 some or any of the derived information, depending on the configuration. Driver assistance system 108 can then take corresponding measures. It may for example prepare brake system 110 for an upcoming emergency braking procedure, or it may initiate the operation of brake system 110 in order to slow down the vehicle. If the information derived by device 100 includes the deceleration rate of the preceding vehicle, driver assistance system 108 may make use of such information by decelerating the vehicle correspondingly, or, if the deceleration is low, not engage in operation.

By means of device 100, the reaction time to an emergency braking of a preceding vehicle can be significantly reduced. For example, by providing a corresponding signal to driver assistance system 108, the vehicle can directly and automatically react to such a situation. Such an automatic reaction is significantly faster compared to a human reaction, as the driver first has to recognize that the vehicle ahead is braking strongly and then has to take the appropriate measures. Similarly, an acoustical or optical warning of the driver improves the driver's reaction time.

Device 100 may be implemented in several different ways. Device 100 may be a vehicle computing system with units 103 and 104 being implemented at least partially as software code portions running on the system. Interfaces 101 and 102 may for example be interfaces to a vehicle network, such as a controller area network or the like. In other implementations, device 100 may be the processing unit of a driver assistance system. As such, based on the derived information, a corresponding control signal may be provided to a controlling function or controlling unit of the driver assistance system. Other implementations are certainly conceivable.

Figure 2:
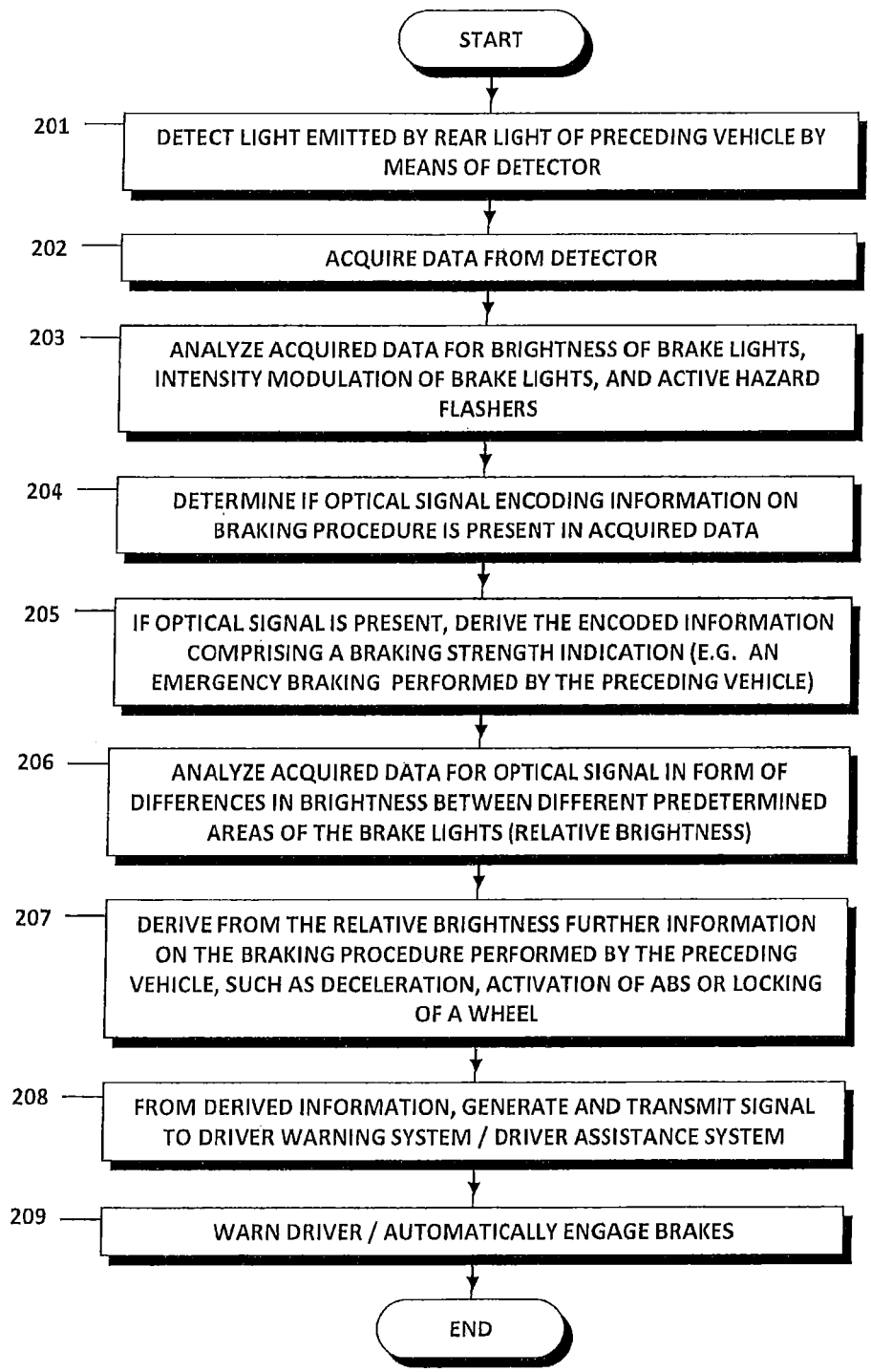
FIG. 2 is a flow chart illustrating the steps of an example method of operation of the system illustrated in FIG. 1.

FIG. 2 illustrates an example method of detecting braking of a vehicle. Device 100 illustrated in FIG. 1 may be configured so as to perform the method of FIG. 2. In a first step 201, light emitted by the rear lights of a preceding vehicle is detected, e.g. by detector 107. The detector 107 monitors continuously an area in front of the vehicle, and as soon as the vehicle travelling ahead enters the monitored area, light emitted by its rear lights is detected. The rear lights can include any type of light sources mounted to the preceding vehicle and emitting light in its rearward direction (e.g. brake lights, tail lights, hazard flashers, turn indicators, and the like). If the driver of the preceding vehicle depresses the brake pedal, the brake lights of the preceding vehicle are activated, which is detected by detector 107. The detection occurs fast enough so that for example an intensity modulation or a change in intensity of the emitted light is detectable.

In step 202 data is acquired from the detector. As mentioned above, this can occur by means of device 100 acquiring image frames, a simple detector signal or the like. The acquired data can be in a digital data format, as this facilitates the later analysis. Detector 107 may directly deliver digital data, or device 100 may include a converter or other means for digitizing the data.

The acquired data may be analyzed for brightness of the brake lights, an intensity modulation of the brake lights and active hazard flashers in step 203. In this example digital image frames may be acquired, however, in other examples any other types of data may be used. The brightness of the brake lights can be detected by analyzing the acquired image frames using for example a thresholding method, as active brake lights have in general a higher intensity than any of the other rearward facing lights of the preceding vehicle. Other methods such as edge detection or shape detection may also be used for finding the position of the brake lights in the acquired image data. The perceived brightness of the brake lights can then deduce from the pixel area of the brake lights in the image data and the pixel intensity values. Alternatively, or in addition, an intensity modulation of the brake lights may be detected. The position of the brake lights may again be identified using a thresholding method, whereas an intensity modulation can be identified by analyzing a time series of intensity values at the corresponding position, e.g. using a Fourier analysis, in order to derive a modulation frequency. Similarly, activation of predetermined light sources, such as hazard flashers may be determined. A differentiation between brake lights and hazard flashers can occur by means of their respective colour (red or yellow, respectively), location, or operational characteristics, such as synchronized cycling of hazard flashers at predetermined intervals.

In step 204 it is determined whether an optical signal encoding information on a braking procedure is present in the acquired data. This may not be the case if the preceding vehicle is a conventional vehicle equipped with a standard brake light which is simply activated irrespective of the severeness of the braking procedure. An optical signal is present in the acquired data if, for example, in the above step an intensity modulation of the brake lights or an activation of the hazard flashers was detected, or if a particular brightness of the brake lights was determined. Changing the brightness of the brake lights for transmitting an optical signal can occur by increasing the intensity emitted by the brake lights or by increasing the light emitting area of the brake lights and thus also the overall intensity. The presence of such an optical signal can be detected by analyzing a time series of images, from which a reference brightness for the brake light may be derived. By comparing the actual brightness value of the brake lights with this reference, an increase in brightness can be detected. Quite often the driver of the preceding vehicle will first engage the brakes with normal strength before performing an emergency braking, so that in general enough data for forming a reference will be available. Alternatively or in addition, other methods of determining a reference, such as determining a brightness reference under consideration of the preceding vehicle's model and distance to the detector may be used.

If an optical signal is present in the acquired data, the encoded information that includes a braking strength indication is derived in step 205. The optical signal is thus "decoded", i.e. its meaning, or braking procedure, is identified. For example, optical signals that are human-perceivable and that indicate severe or emergency braking may be detected in the acquired data in steps 203 and 204. Accordingly, in this example if such an optical signal is present in the acquired data, it can be determined in step 205 that the preceding vehicle is performing a severe or an emergency braking procedure, i.e. that the preceding vehicle is braking strongly and thus has a high rate of deceleration. In other examples more complex information may be derived by a more detailed analysis of a detected optical signal.

Figure 4:
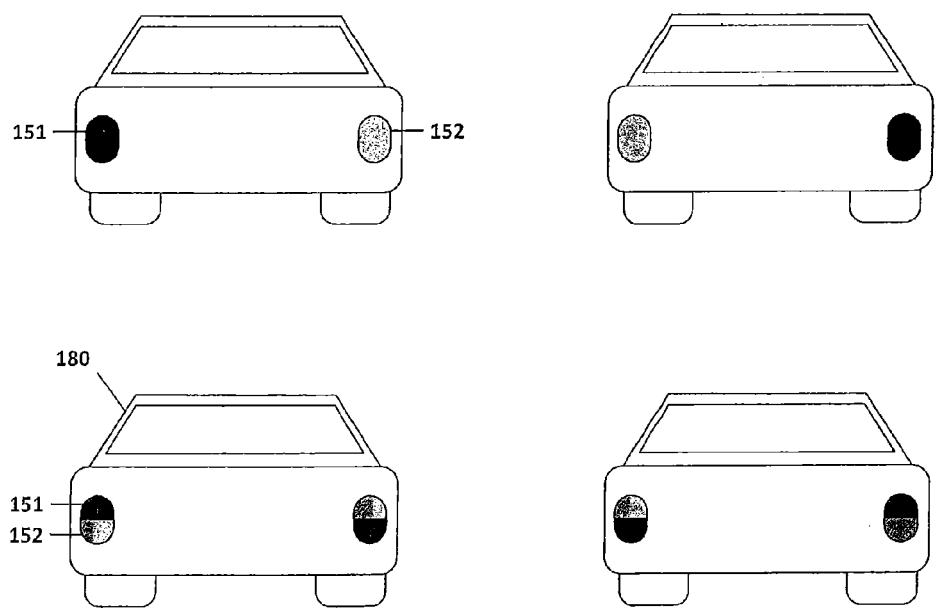
FIG. 4 is a schematic diagram illustrating different example possibilities of encoding information in the relative intensity of light emitted by different light emitting areas of a vehicle's rear light.

Besides a human-perceivable emergency braking signal, the preceding vehicle may relay further information to following vehicles, such as braking procedures, by making use of relative light intensities emitted by the rear lights. Accordingly, the acquired data may be analyzed for an optical signal in form of differences in brightness between different predetermined areas of the brake lights of the preceding vehicle in step 206. Such different areas of the rear lights of the preceding vehicle are schematically illustrated in the examples of FIG. 4. For purposes of clarity, only the brake lights of the vehicle are indicated in the upper row of FIG. 4. In the upper row, the relative brightness between a first area 151 being the left brake light and a second area 152 being the right brake light forms an optical signal and encodes information relayed by the preceding vehicle 180. In the lower row of FIG. 4, an optical signal in the form of a relative brightness is provided between two parts of the same rear light. First and second areas 151 and 152 may for example be two different segments of a brake light or the brake light and a tail light or any other conceivable configuration. In the configuration of the lower row, each rear light may independently transmit information. In some examples, the differences in brightness between the first and second areas is not perceivable to the human eye while it is in others. Not being perceivable has the advantage that drivers of the following vehicle are not distracted.

The detection of such a relative brightness can again occur by using thresholding (detecting pixels with an intensity above a threshold in the image data) in order to localize the positions of the brake lights and then comparing the brightness at the two positions in the acquired image data.

From the detected relative brightness, further information on the braking procedure performed by the preceding vehicles is derived in step 207. Such information can be of the binary type, e.g. whether the ABS is activated or a wheel of the preceding vehicle is locking during the braking procedure. Yet it may also be more complex, the difference in the brightness may for example indicate the rate of deceleration of the preceding vehicle. The way the information is encoded in the relative brightness may be pre-defined, such as in a standard, and device 100 may comprise a look-up table for deriving the information from the detected relative brightness in accordance with such a standard. Manufacturer-specific implementations are certainly also conceivable, and the device 100 can be configured accordingly so that the corresponding information can be derived in step 207.

In the example of FIG. 4 the optical signal "left brake light brighter than right brake light" may encode the information "ABS active". Not only the existence or the amount of relative brightness may encode information, but also the position of the brighter or darker light emitting area. The optical signal "left brake light darker than right brake light" may thus encode "front wheels are locking". There are various ways of encoding information relating to the braking procedure of the preceding vehicle 180 into a relative brightness of the rear lights, and that all these variations are contemplated. Accordingly, the examples provided should not be limiting in any way.

In step 208, the derived information may be used to generate a signal for a driver warning and/or driver assistance system. The signal may include the derived information for interpretation by the corresponding system, or it may already include a control signal for initiating a particular function in the respective systems. For a detected emergency braking procedure performed by the preceding vehicle, the signal to the driver warning system may include a command to issue an acoustical warning to the driver, and the signal transmitted to the driver assistance system may include a command to initialize or to engage the braking system of the vehicle. By means of the acoustic warning, the reaction time of the driver is reduced, while by automatically engaging the brakes, the delay until the vehicle starts to decelerate is significantly reduced. By transmitting the further information derived in step 207 to the driver assistance system, such as the deceleration rate of the preceding vehicle or whether ABS was activated, the response of the driver assistance system can be adjusted accordingly and the automatic reaction of the vehicle can be improved. The driver assistance system can trigger the braking with a corresponding deceleration or may initiate an emergency braking (e.g. if the preceding vehicle has activated its ABS).

The system may operate continuously while the vehicle is travelling. In one example of system operation, a human-perceivable optical signal is first attempted to be recognized in order to identify an emergency braking performed by the preceding vehicle, and further information is then derived from an optical signal provided by the preceding vehicle in form of a relative brightness. In other examples the relative brightness may be detected and may indicate the occurrence of an emergency braking. Alternatively, or in addition, steps 206 and 207 may not be performed. It is also possible to derive further information from the optical signals mentioned with respect to steps 203 and 204, the rate of deceleration of the preceding vehicle may for example be derived from the frequency of the intensity modulation of brake lights or hazard flashers.

Figure 3:
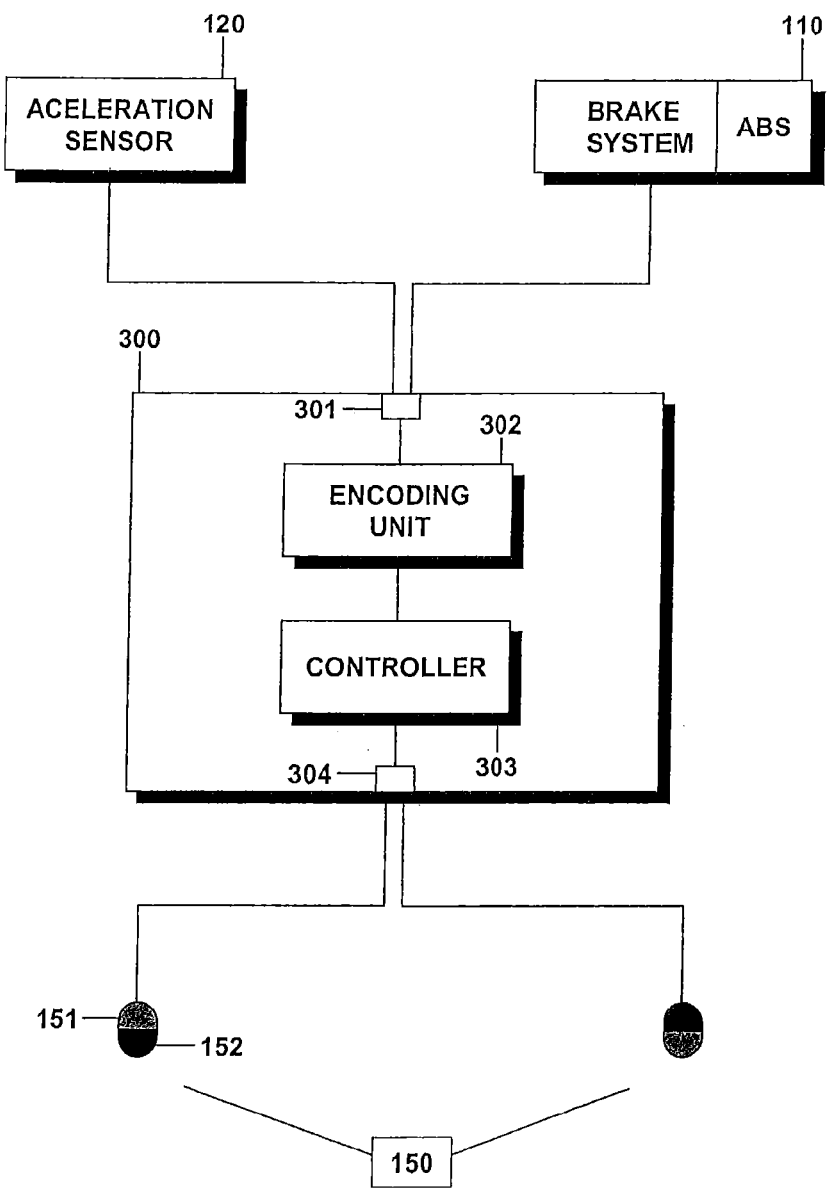
FIG. 3 is a schematic diagram illustrating the components of an example vehicle lighting control unit.

FIG. 3 illustrates an example vehicle lighting control unit 300 that can be mounted to a vehicle and used to control the generation of an optical signal by making use of a relative brightness to transmit information as explained above with respect to FIG. 4. Device 300 thus interacts with device 100 by providing the optical signal that device 100 detects and evaluates. Device 300 has a first interface 301 to a brake system 110 of the vehicle in which it is installed, the brake system may, for example, include an ABS. The first interface 301 may also be to an acceleration sensor 120. In other examples, multiple interfaces may be used. Brake system 110 delivers information such as how strongly the driver depresses the brake pedal (or how strongly the brakes are applied), whether the ABS is active and whether a wheel of the vehicle is locking. Acceleration sensor 120 delivers information on the rate of deceleration of the vehicle.

The lighting control unit 300 further includes an encoding unit 302 which encodes some or all of the information received on interface 301 into an optical signal in form of a relative brightness between at least two different areas of the vehicle's rear lights. The encoding may for example be performed as explained above with respect to FIG. 4.

Controller 303 then generates a corresponding control signal which is supplied to the rear lights 150 by means of interface 304. In the particular example of FIG. 3, the rear lights include brake lights having two segments forming a first area 151 and a second area 152 (for each brake light). Controller 303 then independently adjusts the intensity of light emitted from each of the segments.

In operation, encoding unit 302 may for example receive the information "ABS active" and may supply a corresponding light control signal to controller 303 with the commands "right brake light both segments 100% intensity" and "left brake light upper segment 80% intensity, lower segment 100% intensity". Controller 303 then adjusts the brightness of the brake light segments accordingly, and thus transmits the information to following vehicles.

It should be clear that the optical signal making use of a relative brightness may be more complex as illustrated with respect to FIG. 4, and that the controlling unit 300 may be adapted to control the generation of such a more complex signal. Each brake light may for example be divided in further segments, the light emission intensity of which may be independently controlled by controlling unit 300.

Figure 5:
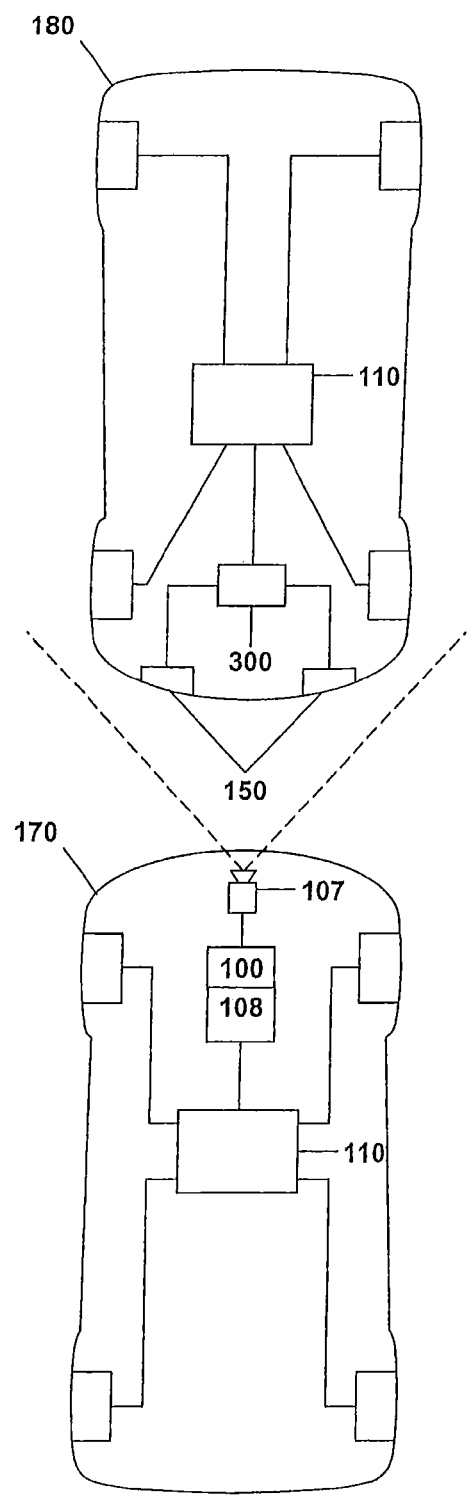
FIG. 5 is a schematic diagram illustrating an example implementation of the device of FIG. 1 and the controlling unit of FIG. 3 in two vehicles and their interaction.

FIG. 5 is a schematic diagram illustrating an example of the interaction between the device 100 of FIG. 1 and the controlling unit 300 of FIG. 3. In the following vehicle 170 detector 107 is installed and monitors an area in the driving direction in which the preceding vehicle 180 is travelling. The preceding vehicle 180 comprises the brake system 110 which is in communication with the lighting control unit 300. If the driver of vehicle 180 brakes strongly, controlling unit 300 receives the corresponding information and modulates the emission of light from rear lights 150 so as to provide any of the above-mentioned optical signals. This signal is detected by device 100 in the image data acquired from camera 107. Device 100 is in this example is implemented within the driver assistance system 108. Device 100 performs the interpretation of the detected optical signal. If the derived information indicates that an emergency braking is necessary, the corresponding component of the driver assistance system 108 supplies a control signal to the braking system 110 of vehicle 170 to activate the brakes. Accordingly, as soon as the optical signal is received, vehicle 170 can react without considerable delay.

In particular at high velocities, a small fraction of a second already corresponds to a travelled distance of several meters. The improved reaction time thus increases the distance between vehicles 180 and 170, and can thus prevent the occurrence of a rear end collision in certain situations.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A method of detecting braking of a vehicle, the method comprising:
    providing a device in a first vehicle, the device being in communication with a detector mounted to the first vehicle;
    monitoring an area in front of the first vehicle with the detector to detect light emitted by rear lights of a second vehicle when the second vehicle is travelling ahead of the first vehicle and is positioned in the monitored area, the device acquiring data from the detector when light emitted by the rear lights of the second vehicle is detected;
    analyzing the acquired data with the device to detect an optical signal emitted by the rear lights of the second vehicle which encodes information indicative of a braking procedure performed by the second vehicle, the information indicative of a braking procedure comprising an indication of braking strength; and
    evaluating the detected optical signal with the device to derive the encoded information indicative of the braking procedure performed by the second vehicle;
    where analyzing the acquired data comprises:
        determining from the acquired data a brightness in at least a first light emitting area and a second light emitting area of the rear lights of the second vehicle; and
        determining a relative brightness between the first and second light emitting areas, wherein the first and second light emitting areas emit light at a same moment in time, and the relative brightness is included in the optical signal.

2. The method according to claim 1, where the device acquiring data from the detector comprises receiving data based on detecting with the detector at least one of a human perceivable optical signal or a human non-perceivable optical signal.

3. The method according to claim 1, where analyzing the acquired data further comprises detecting an intensity modulation of the emitted light at a human perceivable frequency included in the optical signal.

4. The method according to claim 1, where evaluating the detected optical signal comprises determining from the optical signal the braking procedure performed by the second vehicle as being at least one of:
    an emergency braking performed by the second vehicle,
    a rate of deceleration of the second vehicle,
    an activation of an anti-lock braking system of the second vehicle, or
    a locking of a wheel of the second vehicle.

5. The method according to claim 1, wherein analyzing the acquired data comprises detecting optical signals emitted by the rear lights of the second vehicle which are at least one of:
    an intensity modulation of a brake light at a human perceivable frequency,
    an activation of a hazard flasher,
    an increase of a light emitting area of the rear lights,
    an increase of an intensity of light emitted by the rear lights, or
    a presence of an intensity difference between different light emitting areas of the rear lights.

6. The method according to claim 1, where analyzing the acquired data comprises:
    determining a brightness of at least a part of the second vehicle's rear lights from the acquired data;
    comparing the determined brightness with a threshold value; and
    deriving the braking strength indication if the determined brightness is greater than the threshold value.

7. The method according to claim 1, where analyzing the acquired data further comprises:
    relative locations of the first and second light emitting areas having the relative brightness, wherein the optical signal further comprises the relative locations.

8. The method according to claim 1, where evaluating the detected optical signal comprises determining from the relative brightness between the first and second light emitting areas at least one of a rate of deceleration of the second vehicle, activation of an anti-lock braking system of the second vehicle, or locking of a wheel of the second vehicle.

9. The method according to claim 1, where the first and second light emitting areas of the rear lights of the second vehicle are at least one of:
    a respective upper part and a lower part of a brake light of the second vehicle;
    a respective left part and a right part of the brake light of the second vehicle;
    a respective left brake light and a right brake light of the second vehicle; and
    a respective first part and a second part of an illumination pattern provided on the brake light of the second vehicle.

10. The method according to claim 1, where evaluating the detected optical signal comprises deriving the encoded information indicative of the braking procedure as an Emergency Stop Signal emitted by the rear lights of the second vehicle.

11. The method according to claim 1, further comprising the step of the device supplying a signal corresponding to the derived encoded information indicative of the braking procedure to at least one of a driver assistance system or a driver warning system of the first vehicle.

12. A system for detecting braking of a vehicle, the system being adapted to be mounted in a first vehicle, the system comprising:
   a detector mounted to the first vehicle and adapted to monitor an area in front of the first vehicle, the detector adapted to detect light emitted by rear lights of a second vehicle positioned in the area being monitored;
   an analyzing unit adapted to receive and analyze data acquired from the detector to detect an optical signal included in the acquired data, the optical signal emitted by the rear lights of the second vehicle, the optical signal encoding information indicative of a braking procedure being performed by the second vehicle, the braking procedure comprising an indication of braking strength; and
   an evaluation unit adapted to evaluate the detected optical signal to derive the encoded information indicative of the braking procedure of the second vehicle;
   wherein the analyzing unit is further configured to:
      determine from the acquired data a brightness in at least a first light emitting area and a second light emitting area of the rear lights of the second vehicle; and
      determine a relative brightness between the first and second light emitting areas, wherein the first and second light emitting areas emit light at a same moment in time, and the relative brightness is included in the optical signal.

13. The system according to claim 12, further comprising an interface to a driver assistance system or a driver warning system, the system being adapted to supply a signal corresponding to the derived encoded information indicative of the braking procedure to the driver assistance system or the driver warning system.

14. The system according to claim 12, where the analyzing unit is further configured to determine relative locations of the first and second light emitting areas having the relative brightness, where the optical signal further comprises the relative locations.

15. The system according to claim 12, where the analyzing unit is further configured to determine a brightness reference based on previously detected light emitted by the rear lights of the second vehicle, and to use the brightness reference during evaluation of the detected optical signal to derive the encoded information indicative of the braking procedure of the second vehicle.

16. A non-transitory, tangible computer readable medium for storage of instructions executable by a computer for detecting braking of a vehicle, the computer readable medium comprising:
   instructions to receive data from a detector in a first vehicle, the data received from the detector indicative of detected light emitted by a light source of a second vehicle when the second vehicle is positioned in an area being monitored by the detector;
   instructions to analyze the received data to detect an optical signal emitted by the light source of the second vehicle, the optical signal indicative of a braking procedure being performed by the second vehicle, the instructions to analyze the received data including instructions to determine from the received data a brightness in at least a first light emitting area and a second light emitting area of rear lights of the second vehicle and instructions to determine a relative brightness between the first and second light emitting areas, wherein the first and second light emitting areas emit light at a same moment in time, and the relative brightness is included in the optical signal; and
   instructions to evaluate the detected optical signal and to derive the braking procedure performed by the second vehicle from the optical signal.

17. The non-transitory, tangible computer readable medium of claim 16, further comprising instructions to detect brightness differences in the optical signal that are not human-perceivable changes in brightness as indicative of the braking procedure.

18. The non-transitory, tangible computer readable medium of claim 16, further comprising instructions to detect an intensity modulation included in the optical signal as indicative of the braking procedure.

19. The non-transitory, tangible computer readable medium of claim 16, wherein the instructions to analyze the received data further include instructions to determine from the received data relative locations of the first and second light emitting areas having the relative brightness, and wherein the relative locations are included in the optical signal.

* * * * *